United States Patent [19]
Campbell

[11] Patent Number: 5,136,385
[45] Date of Patent: Aug. 4, 1992

[54] ADAPTIVE VERTICAL GRAY SCALE FILTER FOR TELEVISION SCAN CONVERTER

[76] Inventor: Jack J. Campbell, 1161 De Haro St., San Francisco, Calif. 94110

[21] Appl. No.: 712,423

[22] Filed: Jun. 10, 1991

Related U.S. Application Data

[62] Division of Ser. No. 466,469, Jan. 17, 1990.

[51] Int. Cl.$^5$ ............................................... H04N 5/21
[52] U.S. Cl. ..................................... 358/160; 358/167
[58] Field of Search .................. 358/167, 160, 140, 36

[56] References Cited

U.S. PATENT DOCUMENTS

| | | | |
|---|---|---|---|
| 4,825,289 | 4/1989 | Ohta | 358/167 |
| 4,926,261 | 5/1990 | Matsumoto et al. | 358/167 |

*Primary Examiner*—James J. Groody
*Assistant Examiner*—David E. Harvey
*Attorney, Agent, or Firm*—James E. Eakin

[57] ABSTRACT

An adaptive vertical low pass filter for a television signal process comprises an input for receiving an unfiltered video data stream and an output for putting out an adaptively low pass filtered video data stream. An adaptive processing circuit between the input and the output provides the adaptively low pass filtered video data stream in accordance with an adaptive control signal. A vertical condition detection circuit is responsive to at least one predetermined vertical condition at the input and includes a filtering component generator for generating the adaptive control signal in response to detection of the predetermined vertical pixel condition and for applying the adaptive control signal to the combiner circuit. The predetermined vertical pixel conditions may include vertical high frequency energy, integrated vertical high frequency energy, vertical impulses of one or two scan line durations irrespective of magnitude or direction, vertical transition edge levels, picture level or picture motion irrespective of magnitude or direction.

2 Claims, 4 Drawing Sheets

ADAPTIVE VERTICAL GRAY SCALE FILTER FOR TELEVISION SCAN CONVERTER

This is a division of application Ser. No. 07/466,469, filed Jan. 17, 1990.

FIELD OF THE INVENTION

The present invention relates to television video signal processing methods and equipment. More particularly, the present invention relates to methods and apparatus for adaptive reduction of vertical high frequency energy components to reduce perceptible flicker artifacts incident to scan conversion processes within television video signals and systems.

BACKGROUND OF THE INVENTION

In the process of video scan conversion, data sampling rate (Nyquist) problems are presented in many different ways. One of the most visually objectionable problems presented by the sampling rate is that of field flicker. Field flicker occurs, for example, when a progressively scanned image is converted into an interlaced scan image. When progressive-to-interlace scan conversion occurs within an NTSC television system, the flicker occurs at the 30 Hz frame rate. When progressive-to-interlace scan conversion occurs within a PAL television system, the flicker rate is 25 Hz.

One prior approach to flicker reduction has been to provide vertical low pass filtering of the scan converted video stream. While vertical low pass filtering is effective to remove the flicker artifacts from the displayed picture image, the tradeoff has been significant, perceptible loss of vertical resolution in the resultant picture display.

The present inventor has proposed a solution to the problem of flicker reduction in single bit computer graphics systems in which light transitions are between black and white, i.e. wherein there is no gray scale range. That solution is to be found in copending U.S. patent application Ser. No. 07/445,369, filed on Dec. 4, 1989, and entitled "Scan Converter with Adaptive Vertical Filter for Single Bit Computer Graphics Systems", the disclosure of which is hereby incorporated herein by reference.

Heretofore, there has been no satisfactory method to remove flicker artifacts from a scan converted television image signal stream without constantly degrading the vertical resolution.

SUMMARY OF THE INVENTION WITH OBJECTS

A general object of the present invention is to provide an adaptive vertical gray scale filter for a television signal process, such as a scan conversion process, in order to reduce flicker artifacts in the resultant picture image display.

A more specific object of the present invention is to control the amount of vertical low pass filtering as a function of the detection of certain predetermined, measureable vertical conditions in the incoming video signal stream which may lead to the perception of flicker in the resultant picture by the viewer.

One more specific object of the present invention is to detect the occurrence and magnitude of predetermined vertical conditions in order to generate a vertical low pass filter control coefficient, and then adaptively to apply the coefficient to control a vertical low pass filter in order to reduce otherwise present, resultant flicker artifacts in a scan converted video picture image display.

In accordance with the principles of the present invention, an adaptive vertical low pass filter for a television signal process comprises an input for receiving an unfiltered video data stream and an output for putting out an adaptively low pass filtered video data stream. An adaptive processing circuit between the input and the output provides the adaptively low pass filtered video data stream in accordance with an adaptive control signal. A vertical condition detection circuit is responsive to at least one predetermined vertical condition at the input and includes a filtering component generator for generating the adaptive control signal in response to detection of the predetermined vertical pixel condition and for applying the adaptive control signal to the combiner circuit. The predetermined vertical pixel conditions may include vertical high frequency energy, integrated vertical high frequency energy, vertical impulses of one or two scan line durations irrespective of magnitude or direction, vertical transition edge levels, picture level or picture motion irrespective of magnitude or direction.

In one presently preferred form, an adaptive vertical low pass filter in accordance with the invention adaptively low pass filters vertically aligned pixels of an incoming television picture image in order to reduce the appearance of flicker in a resultant display of the image following scan conversion thereof, for example. The adaptive vertical low pass filter structure includes an input, a first path from the input leading to an additive node of a first combining circuit, a second path from the input leading through a vertical high pass filter and a multiplier circuit connected in tandem to a subtractive node of the first combining circuit and an output being the difference put out by the first combining circuit. At least one control coefficient generator connected to the input detects the presence and magnitude of predetermined incoming vertical pixel conditions and generates therefrom a control coefficient having a fractional value between zero and unity. The control coefficient is applied as a multiplier to the multiplier circuit in time with the incoming vertical pixel pattern component passed by the vertical high pass filter. The resultant product is then applied to the subtractive node of the first combining circuit and is subtracted from the video signal on the first path, thereby resulting in an adaptively controlled vertical low pass filter.

These and other objects, aspects, advantages and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
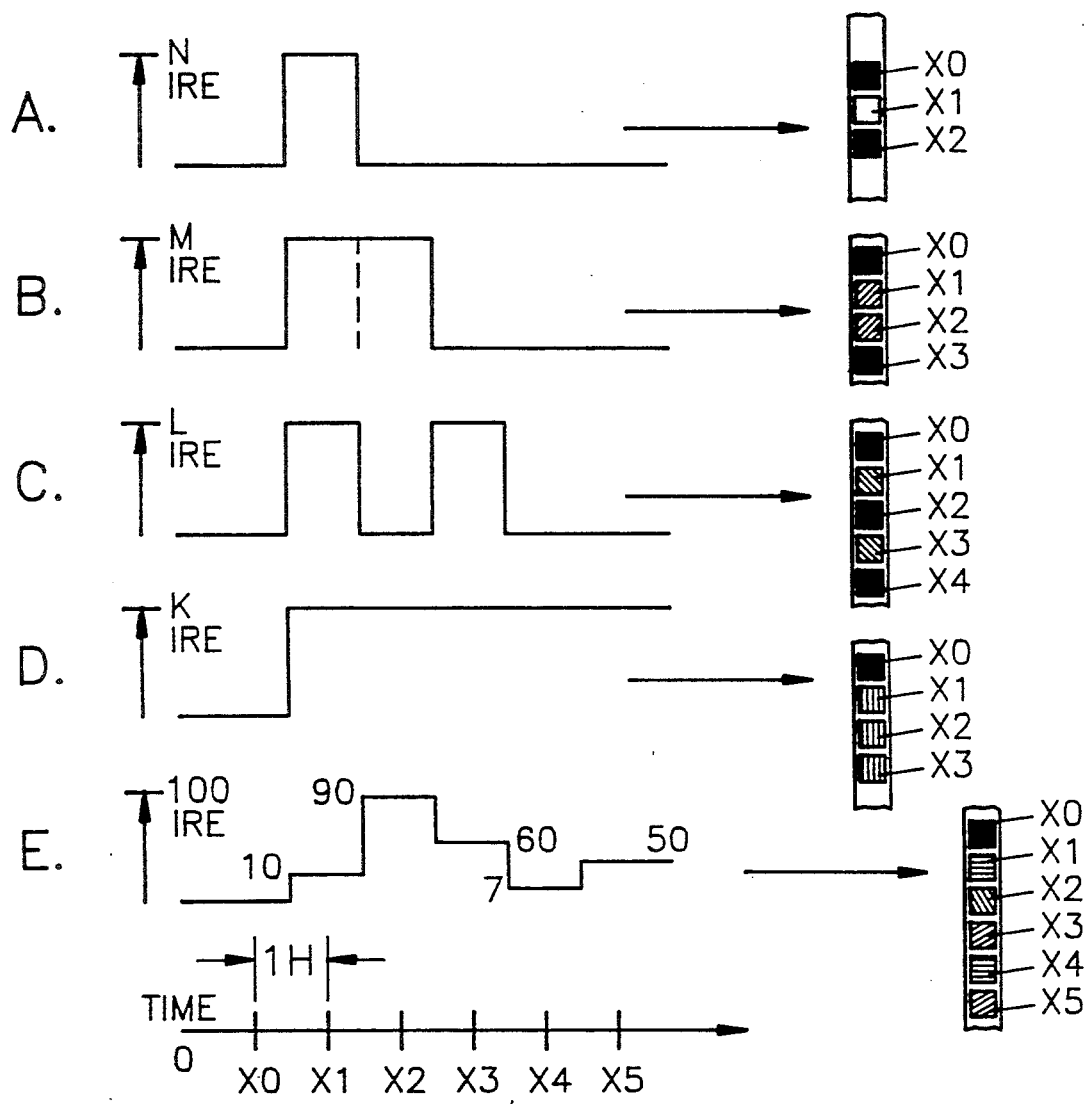
FIG. 1 is a series of graphs of pixel-duration amplitude values illustrating a variety of time-aligned vertical pixel patterns which may result in flicker upon scan conversion within a television signal processing system. The FIG. 1 graphs A through E are plotted along a common horizontal time line wherein each division marks a time delay of one scan line duration. The vertical axis for each graph is amplitude. To the right of each time line graph is a corresponding pixel pattern graph in the vertical domain.

Referring now to the FIG. 1 graphs A through E, some of the various vertical pixel conditions are illustrated which lead to flicker in a resultant picture display after scan conversion processes, for example. Graph A represents a positive-going vertical impulse, i.e. a pixel value x1 having a gray scale amplitude of N IRE units, for example. The x1 pixel level is preceded by a pixel value x0 having a minimal IRE units (black level) amplitude and which is followed by a pixel value x2 also having a black level amplitude. Graph A is thus to be understood as an amplitude plot of three vertically arranged pixels x0, x1 and x2 wherein x0 and x2 are at or below the black level, and x1 is at a white level of amplitude N. Of course, the vertical impulse could be inverted in sign and proceed from white to black to white. The vertical impulse graphed in graph A of FIG. 1 is particularly troublesome within progressive scan to interlaced scan conversion processes, as frame-rate flicker in the picture display is a direct consequence of this pattern.

Graph B illustrates a vertical impulse extending over two pixels x1 and x2 having an amplitude M. This pattern is not apt to cause flicker, since energy of the impulse will be present in resultant odd and even scan fields. In this instance, very little, if any adaptive vertical low pass filtering is required, and the consequence is that the image of which the Graph B pattern is a part will not be degraded by filtering as a result of scan conversion.

Graph C essentially illustrates a repeating pattern of alternating positive vertical impulses x1 and x3 of amplitude L separated by single pixels x0, x2, x4, at a black level, etc. Within a scan conversion process from progressive scan to interlaced scan, this pattern is going to result in very objectionable flicker in the resultant picture, as the pixel impulses will be concentrated in a single field whose appearance alternates with the other field within the resultant interlaced frame. This pattern, which can be detected by the impulse detector described in conjunction with FIGS. 2 and 3, requires adaptive vertical low pass filtering, the amount of which is dependent upon the magnitude L of the pixels x1, x3, relative to the vertically adjacent pixels x0, x2, x4, etc.

Graph D illustrates a vertical transition from dark to a light amplitude K at a particular vertical pixel location (between pixels x0 and x1. This transition, if sharp, includes considerable high frequency energy, and will result in flicker at the frame rate as a consequence of scan conversion from progressive to interlaced, for example. This pattern, as well as the impulse patterns of Graphs A, B and C, is capable of being detected by both the FIG. 2 and FIG. 4 adaptive filters and used to regulate the presence and amount of vertical low pass filtering in the resultant video signal stream.

Graph E illustrates a series of progressively scanned, vertically aligned pixels having various gray scales as are typically encountered in normal television video signal streams.

Figure 2:
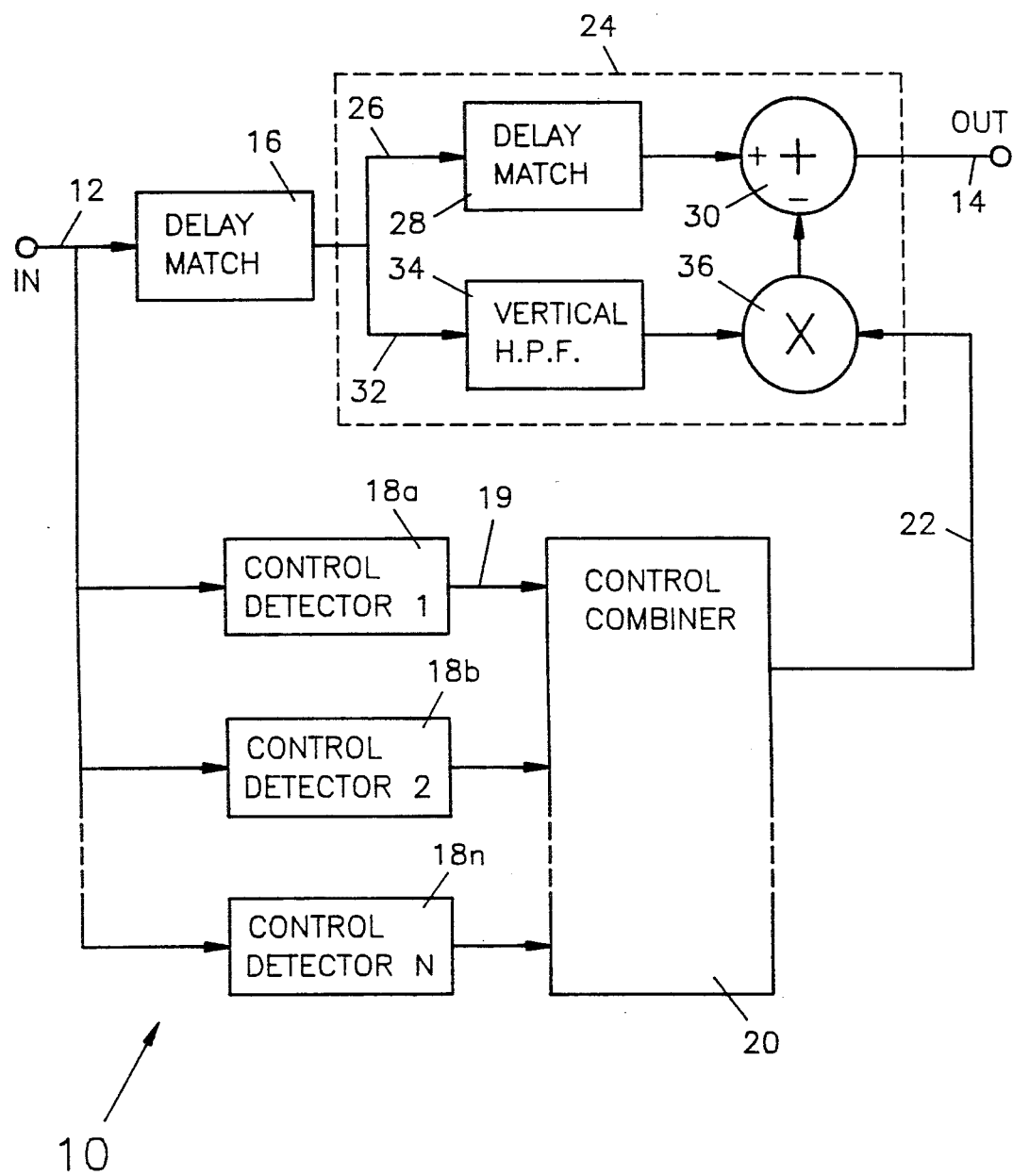
FIG. 2 is an overall system block diagram of an adaptive vertical low pass filter incorporating the principles of the present invention.

Referring now to FIG. 2, an adaptive vertical low pass filter structure 10 includes an input for receiving a video signal stream in a predetermined signal format, such as progressive scan, for example. An output 14 puts out the incoming video signal stream after it has been adaptively low pass filtered with reference to the vertical domain; i.e. with reference to pixel patterns aligned vertically, as opposed to horizontally or temporally. A delay match 16 compensates for any transit delays resulting when the input signal is passed in parallel through a one or more control detectors 18, and through a control signal combiner circuit 20 when more than one control detector 18 is present in the filter structure 10.

Three control detectors 18a, 8b and 18n are shown in FIG. 2 to illustrate that a separate control detector 18 may be advantageously provided for each separate vertical pixel condition to be detected in order to reduce flicker in the resultant display. The detectors 18 may respond to any one or more of the following picture conditions:

1. Rectified vertical high frequencies;
2. Rectified integrated vertical high frequency energy over some predetermined time interval;
3. Rectified vertical impulse level, of an impulse of single pixel duration at the scan rate;
4. Rectified vertical impulse level, of an impulse of double pixel duration at the scan rate;
5. Rectified transitional edge level;
6. Actual average level of the picture;
7. Motion within the picture;
8. Multiple detectors of any of the foregoing, such as multiple impulses (FIG. 1c).

The combiner circuit arbitrates between and selects control coefficient values put out by each control detector 18, and may send on the control coefficient having the greatest magnitude, or it may combine the control coefficients in a predetermined manner to provide a composite control coefficient. The control coefficient is passed to a main low pass filter circuit 24 via a control coefficient bus 22. The value present on the control coefficient bus 22 is a fractional value which lies between zero and unity and is a function of the presence and magnitude of a vertical pixel pattern detected by one or more of the detectors 18.

The main vertical low pass filter circuit 24 includes a first signal path 26 which leads through a local delay match circuit 28 to an additive node of a first combiner circuit 30. A second signal path 32 parallels the first path 26 and extends through a vertical high pass filter 34 and a multiplier circuit 36. An output from the multiplier circuit 36 extends to a subtractive node of the first combiner circuit. The control coefficient bus 22 provides a multiplier value to the multiplier circuit 36. The product put out by the multiplier 36 comprises vertical high frequency components which have been extracted by the vertical high pass filter 34 from the main video signal stream. These components are scaled by being multiplied by the fractional control coefficient and are thereafter subtracted from the main signal stream of the first path in proper time arrangement as set by the delay matching circuit 28. Thus, the amount of high frequency components which are subtracted from the main path video is a function of the fractional control coefficient, which is in turn a function of the detection of the presence and magnitude of one or more predetermined picture conditions in the incoming video stream by the detector(s) 18.

Figure 3:
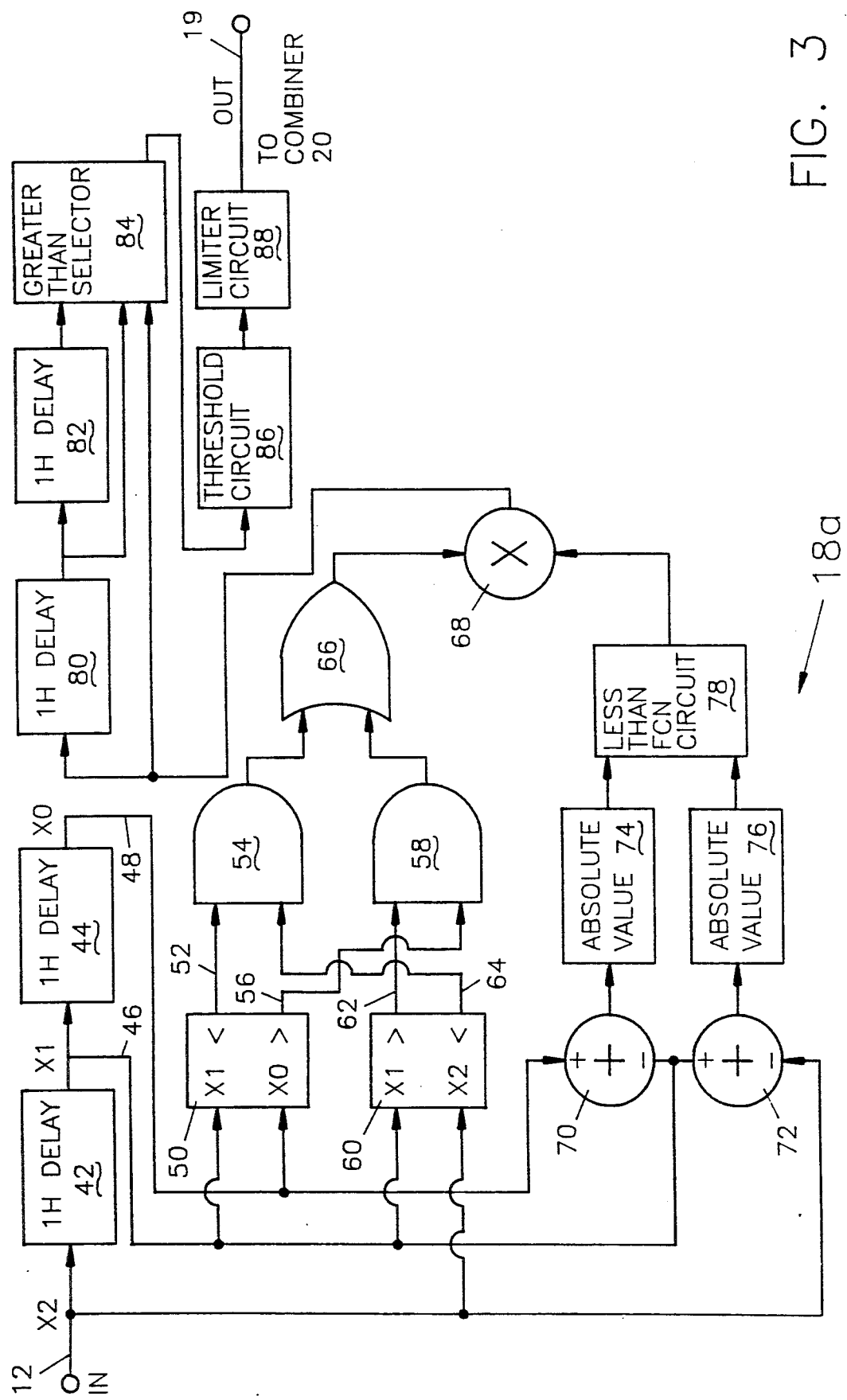
FIG. 3 is a detailed block diagram of a vertical impulse control detector for inclusion and use within the FIG. 2 low pass filter.

FIG. 3 sets forth one implementation of the detector 18a which is adapted to detect the presence and gray scale amplitude of vertical impulses, such as the positive impulse graphed in Graph A of FIG. 1. (The FIG. 3 circuit will also detect the patterns illustrated in Graphs C and E of FIG. 1). For purposes of discussion, assume that the incoming pixel at the input is pixel x2, the latest of three vertical pixels x0, x1 and x2 to arrive. The two earlier pixels x1 and x0 are obtained by virtue of two tandem-connected delay circuits 42 and 44, each of which provides a one scan line period delay. Thus, when pixel x2 is on the input line 12, the pixel x1 is on a line 46 from the delay 42, and the pixel x0 is on a line 48 from the delay 44. The lines 12, 46 and 48 variously extend to a first logic circuit 50, a second logic circuit 60, a first summing circuit 70 and a second summing circuit 72, as shown in FIG. 3.

The first logic circuit puts out a true signal on a line 52 if the x1 pixel amplitude is less than the pixel x0 amplitude; and puts out a true signal on a line 56 if the amplitude of the pixel x0 is less than the amplitude of the pixel x1. The line 52 is one input to a first AND gate 54, and the line 56 is one input to a second AND gate 58.

The second logic circuit 60 puts out a true signal on a line 62 if the amplitude of pixel x2 is less than the amplitude of the pixel x1; and it puts out a true signal on a line 64 if the amplitude of pixel x2 is greater than the amplitude of the pixel x1. The line 62 provides the other input to the AND gate 58, while the line 64 provides the other input to the AND gate 54.

The output of the AND gate 54 is true if the pixel x1 has an amplitude which is less than both pixels x0 and x2. The output of the AND gate 58 is true if the pixel x1 has an amplitude which is greater than both pixels x0 and x2. The outputs from the AND gates 54 and 58 are passed as inputs to an OR gate 66 which provides a true signal whenever an output from either, but not both, AND gate 54 or 58 is present. Thus, the AND gate 54 detects the presence of a positive going (black to white to black) vertical impulse; while the AND gate 58 detects the presence of a negative going (white to black to white) vertical impulse.

The output from the OR gate 66 provides a multiplier value to a second multiplier circuit 68. The multiplier value is either zero or unity. When a vertical impulse is detected, the multiplier value is unity. When a vertical impulse is not detected, the multiplier value is zero.

The first and second summing junctions 70 and 72 function to subtract the amplitude of the x1 pixel respectively from the x0 and x2 pixel amplitudes. The resultant differences are cleansed of sign by absolute value circuits 74 and 76. A logic circuit 78 compares the magnitudes of the absolute-value differences and selects and puts out the difference value having the lesser absolute magnitude as the multiplicand to the second multiplier circuit 68.

The product put out by the multiplier 68 is supplied to an input of a first delay line 80 which is connected in tandem with a second delay line 82. The delay lines 80 and 82 each provide scan line period delays. The product put out by the multiplier 68 is also supplied to a logic circuit 84 as are the delayed values put out from the delays 80 and 82. The logic circuit 84 functions as a "greater than" selector and puts out the value from either the multiplier 68, delay 80 or delay 82 having the greater absolute value. Thus, the logic circuit 84 acts as a vertical stretching circuit and results in a control coefficient which is stretched to be present over three adjacent scan lines at the location of pixels x0, x1 and x2. The consequence of this vertical stretching is that the low pass filter structure 10 spreads or averages the vertical impulse over three adjacent scan line pixels, with the amplitude of an original, maximum value (100 IRE unit) impulse being reduced by about half and a quarter of the original amplitude being added to each of the preceding and following vertical pixels.

A threshold circuit 86 cuts off any control coefficient below a predetermined minimum threshold amplitude level in order to prevent noise from becoming injected into the main path video stream, and a limiter circuit 88 limits the control coefficient magnitude to some maximum value, such as not greater than unity.

Figure 4:
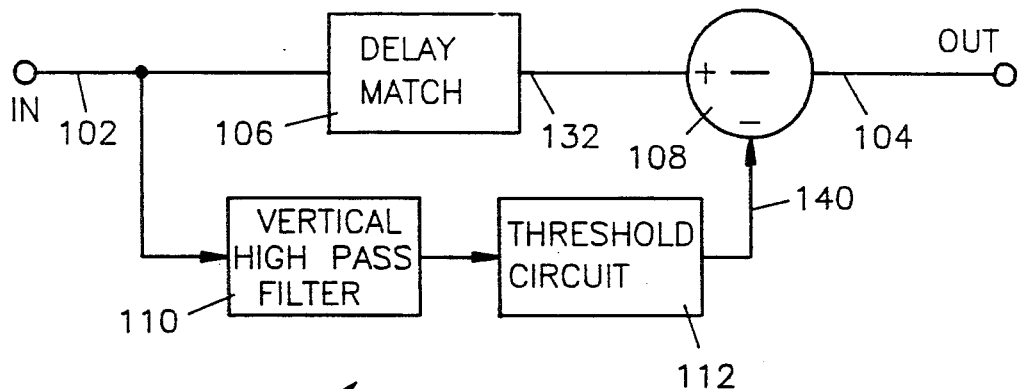
FIG. 4 is a block diagram of a simplified adaptive vertical low pass filter in accordance with the principles of the present invention which applies vertical low pass filtering in function of detected magnitude of vertical high frequency components in the incoming video signal stream.
Figure 5:
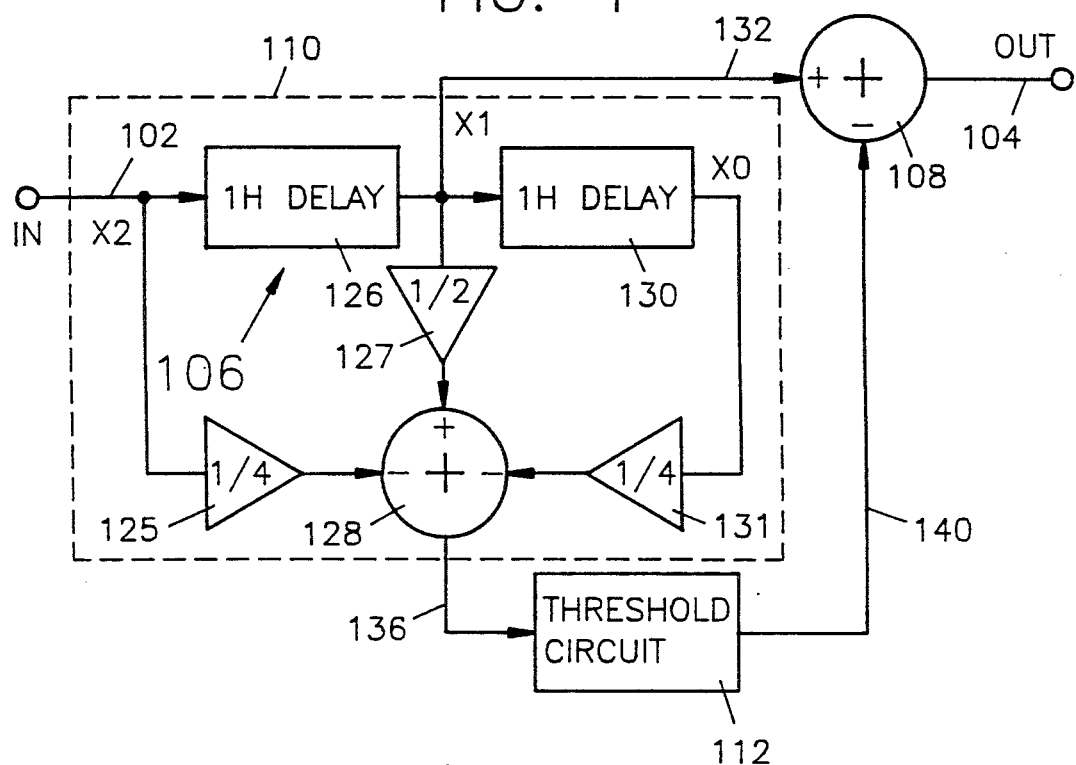
FIG. 5 is a block diagram of the FIG. 4 filter with further structural details provided relating to the vertical high pass filter element thereof being illustrated.
Figure 6:
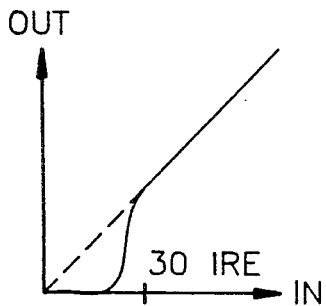
FIG. 6 is a graph of a threshold curve illustrating operation of the FIG. 4 adaptive vertical low pass filter.

With reference to FIGS. 4–6, a simplified adaptive vertical low pass filter 100 includes an input 102 for receiving the incoming video stream and an output 104 for providing adaptively low pass filtered video in accordance with the principles of the present invention. A delay matching circuit 106 and a combiner circuit 108 are present within a main path extending between the input 102 and the output 104. The main path video stream is applied to an additive node of the combiner circuit 108.

A vertical high pass filter 110, implemented as shown in FIG. 5, is also connected to receive the incoming video stream present at the input 102. The vertical high pass filter 110 filters the incoming video stream in the vertical domain so as to extract and put out vertical high frequency energy, such as is associated with the sharp transition illustrated in Graph D of FIG. 1. The high pass filtered vertical information is then put through a threshold circuit 112 and then applied to a subtractive node of the combining circuit 108. The threshold circuit preferably implements the transfer characteristic graphed in FIG. 6. When the vertical high frequency energy is of low amplitude, no low pass filtering occurs. Filtering occurs when the high frequency amplitude reaches some predetermined value, such as 20 IRE units and increases sharply until about 40 IRE units of magnitude. Thereafter, the amount of low pass filtering is fixed, with pixel coefficients being e.g. $\frac{1}{4}$, $\frac{1}{2}$, $\frac{1}{4}$. The delay match 106 matches the main path video to the component passing through the vertical high pass filter 110 and the threshold circuit 112.

FIG. 5 illustrates the FIG. 4 filter 100 in greater structural detail. The input 102 leads to a scan line period delay 126 which not only provides a delayed signal within the high pass filter structure 110, but which also conveniently implements the delay matching circuit 106 shown in FIG. 4. The input leads through a one-quarter amplitude gain amplifier 125 to a subtractive node of a combiner circuit 128. An output 132 of the delay 126 leads to an input of a second scan line period delay 130, to an additive node of the combiner circuit 128 via a one-half amplitude gain amplifier 127, and to an additive node of the main combiner circuit 108 leading to the output 104. An output from the second delay 130 leads via a one-quarter amplitude gain amplifier 131 to a second subtractive node of the combiner circuit 128. An output line 136 from the combiner circuit 128 provides vertical high frequency energy components of the incoming video stream, and those components are then passed through the threshold circuit 112. An output from the threshold circuit 138 is provided over a line 140 to a subtractive node of the main combiner circuit 108. Extracted vertical high frequency components are thereby adaptively subtracted from the main path within the main combiner circuit 108 in accordance with the FIG. 6 curve, thereby resulting in adaptive low pass filtered, one scan line delayed video at the output 104.

While the adaptive vertical low pass filter circuits 10 and 100 as shown and discussed herein are preferably implemented within digital television signal processing systems, analog implementations are readily feasible. Having thus described presently preferred embodiments of the present invention, it will now be appreciated by those skilled in the art that the objects of this invention have been fully achieved, and it will be understood by those skilled in the art that many changes in construction and widely differing embodiments, techniques and applications of the invention will suggest themselves without departure from the spirit and scope of the present invention. The disclosures and the description given hereinabove are therefore purely illustrative and are not intended to be in any sense limiting.

I claim:

1. An adaptive vertical low pass flicker filter for use within a television signal scan conversion process, the flicker filter comprising an input for receiving an unfiltered video data stream, an output for putting out an adaptively low pass filtered, flicker-reduced video data stream, and combining circuit means located in a main path between the input and the output, the filter further comprising vertical high pass filter means connected to the input for passing vertical high frequency energy components and threshold means connected to receive the passed vertical high frequency energy components and pass them above a predetermined threshold set above picture noise level, the threshold-passed high frequency energy components being subtracted in proper time and phase at the combining circuit means from the video data stream passing through the main path.

2. The adaptive vertical low pass flicker filter set forth in claim 1 wherein the predetermined threshold established at the threshold means is approximately 20 IRE units.

* * * * *